United States Patent [19]

Funatsu et al.

[11] 3,953,384

[45] Apr. 27, 1976

[54] PROCESS FOR PREPARING POLYURETHANE FOAMS

[75] Inventors: Makoto Funatsu; Shinichiro Yasuda; Toshimitu Hiraizumi, all of Wakayama, Japan

[73] Assignee: Kao Soap Co., Ltd., Tokyo, Japan

[22] Filed: Oct. 25, 1974

[21] Appl. No.: 517,933

[30] Foreign Application Priority Data
Oct. 30, 1973  Japan.............................. 48-122007

[52] U.S. Cl..................... 260/2.5 AC; 260/2.5 AW; 260/75 NC; 260/77.5 AC; 260/77.5 NC
[51] Int. Cl.²................... C08G 18/18; C08G 18/20
[58] Field of Search................ 260/2.5 AC, 2.5 AW, 260/77.5 AC, 75 NC, 77.5 NC

[56] References Cited
UNITED STATES PATENTS

| | | | |
|---|---|---|---|
| 2,866,762 | 12/1958 | Brochhagen | 260/2.5 AC |
| 3,201,358 | 8/1965 | Hostettler | 260/2.5 AC |
| 3,620,985 | 11/1971 | Larkin | 260/2.5 AC |
| 3,821,131 | 6/1974 | Priest | 260/77.5 AC |

FOREIGN PATENTS OR APPLICATIONS

| | | | |
|---|---|---|---|
| 651,638 | 11/1962 | Canada | 260/2.5 AC |

OTHER PUBLICATIONS

Brewster, *Organic Chemistry;* 3rd Ed., Prentice–Hall; 1961, p. 210.

*Primary Examiner*—C. Warren Ivy
*Attorney, Agent, or Firm*—Woodhams, Blanchard and Flynn

[57] ABSTRACT

A process for preparing polyurethane foams by the reaction between a polyol having at least two active hydrogen atoms and a polyisocyanate, in the presence of a potassium β-tertiary-aminopropionate as a catalyst.

3 Claims, No Drawings

PROCESS FOR PREPARING POLYURETHANE FOAMS

BACKGROUND OF THE INVENTION

1. Field of the Invention

This invention relates to a process for preparing a polyurethane foam by reacting a polyol having at least two active hydrogen atoms with a polyisocyanate, in the presence of a potassium $\beta$-tertiary-aminopropionate as a catalyst, whereby good foams can be obtained in a broad range of the index of the mole ratio of the isocyanate groups to the active hydrogen atoms.

2. Description of the Prior Art

According to conventional methods, polyurethane foams are prepared by reacting a polyester-type or polyether-type polyol having at least two active hydrogen atoms, with a polyisocyanate, in the presence of water or a foaming agent such as Freons, a foam-regulating agent such as a silicone and another surface active agent (which is not used in some cases), a catalyst, a filler, a flame retardant and the like. As the catalyst, there are generally employed tin compounds such as stannous octanoate and dibutyl tin laurate and tertiary amines. In the art of preparing polyurethane foams it is known that a polyurethane foam having an isocyanurate structure can be prepared if the amount of the polyisocyanate present during the reaction is such that the amount of isocyanate groups is in excess in relation to the amount of the active hydrogen atoms of the polyol. As the catalyst used for this reaction, there are generally employed alkali metal carboxylates such as potassium acetate and sodium acetate, non-basic metal salts such as lead octanoate and lead naphthenate, and tertiary amines such as dialkylaminoalkyl-phenols.

However, the activity of all of these known catalysts is greatly influenced by the index, i.e., the coefficient indicating the molar ratio (× 100) of the isocyanate groups to the active hydrogen atoms, an index value of 100 indicating the equivalent amount and an index value of 200 indicating that the amount of the isocyanate groups is twice the equivalent amount. For example, when a tertiary amine or tin compound is used as a catalyst, good foams cannot be obtained unless the catalyst is employed with an index of 100 to 105. Further, in the case of catalysts for preparing polyurethane foams containing an isocyanurate structure, such as alkali metal carboxylates, non-basic metal salts and tertiary amines, a sufficient effect can be obtained when the index is within a range of about 150 to about 300, but they are substantially ineffective when the index is within a range of 100 to 105. Accordingly, in the conventional methods, if it is necessary to change the index, it is also necessary to change the kind of catalyst used, and hence, various disadvantages are brought about in operations, such as mixing of the starting substances.

SUMMARY OF THE INVENTION

We have discovered that the use of potassium $\beta$-tertiary-aminopropionates, as a catalyst, exhibits surprising effects, and that it is possible effectively to use this catalyst within a broad range of index of 100 to 500. More specifically, potassium $\beta$-tertiary-aminopropionates have a very high catalytic activity within a broad range of the index. Especially when they are used for forming isocyanurate-containing polyurethane foams, namely, when higher index values are employed, they have a much higher solubility in the polyurethane-forming components than conventional catalysts. Therefore, they can be easily handled in the polyurethane foam production process.

As the potassium $\beta$-tertiary-aminopropionates to be used in the process of this invention, compounds having the following formulae are especially effective:

  (1)

  (2)

  (3)

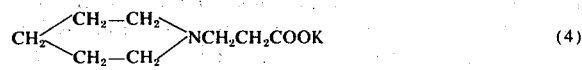  (4)

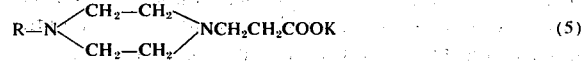  (5)

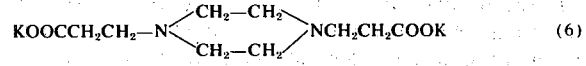  (6)

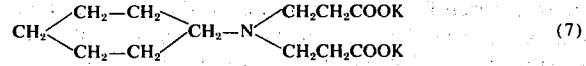  (7)

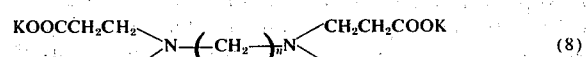  (8)

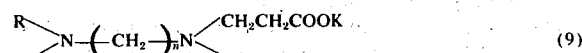  (9)

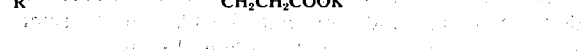

In the foregoing formulae, R and R' are alkyl groups having 1 to 18 carbon atoms, preferably alkyl having 1 to 4 carbon atoms, especially methyl, and $n$ is an integer from 2 to 6.

These compounds are prepared by carboxyethylating a suitable amine, that is, reacting a suitable amine with the same moles of methyl acrylate as those of activated hydrogen atoms attached to said amine at a temperature of below 40°C, and converting the carboxylation product to a potassium salt at a temperature of below 60°C.

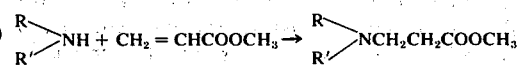

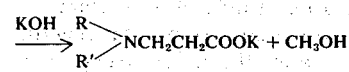

The reaction is carried out in a solvent such as methyl alcohol, ethyl alcohol, ethylene glycol and diethylene glycol. An example of the preparation is illustrated as follows: 200 ml of methanol and 46 gr. (equivalent to 1 mol) of dimethyl amine having the purity of 99 percent were introduced into a flask. While the temperature of the mixture was kept at below 40°C, 1 mol of methyl acrylate was dropwise added thereto to proceed gentle exothermic reaction. After the addition, the reaction product was allowed to stand for one hour to be aged. Thereafter, while it was cooled, 66 gr. of potassium hydroxide having the purity of 85 percent was added thereto. Next, methyl alcohol was topped and white crystalline of the product, potassium-β-dimethylaminopropionate, was obtained. Other compounds are prepared in the same manner as follows:

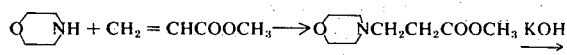

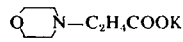

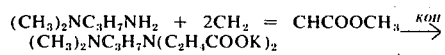

Since they can be prepared simply at a low cost, they are advantageous in comparison with the conventional catalysts from the economic viewpoint.

The reason why potassium β-tertiary-aminopropionates have conspicuously and unexpectedly improved effects in comparison with conventional catalysts for the preparation of polyurethane foams has not been elucidated to date. Salts other than potassium salts are inferior to potassium salts with respect to their catalytic activity, and the reason for this is unknown to date.

In the process of this invention, the amount of the potassium β-tertiary-aminopropionate can be varied within a broad range depending on the reaction conditions adopted for the preparation of the polyurethane foams, such as the reaction time, but in general, it is most preferred that the catalyst is used in an amount of 0.1 to 5.0% by weight based on the total starting liquid mixture of the polyol and the polyisocyanate to be used for preparing polyurethane foam.

The polyurethane foams prepared according to the process of this invention can be used as interior materials for buildings and cars, and the like, in the same manner as conventional polyurethane foams.

This invention will now be further described by reference to the following illustrative Examples.

In the Examples, the term "parts" refers to parts by weight.

EXAMPLE 1

100 parts of a glycerin base propylene glycol having a molecular weight of 3,000, 4.5 parts of water, 2.0 parts of silicone and an activating agent, 0.3 part of stannous octanoate and 0.2 part of potassium dimethylaminopropionate were pre-mixed, and 55.0 parts of TDI (tolylene diisocyanate) (the index being 105) was added thereto. When the mixture was agitated, a good soft polyurethane foam was prepared with a creaming time of 10 seconds and a rising time of 70 seconds.

The above procedures were repeated by changing the amount of TDI to 70.0 parts (the index being 133), 90.0 parts (the index being 172) and 110 parts (the index being 210), and adjusting the amount of potassium dimethylaminopropionate so that the concentration thereof, based on the total starting liquid mixture, was the same as above. Although a good foam could be obtained without adjusting the catalyst concentration, the reaction time was lengthened as the catalyst concentration decreased. In each case, a good soft polyurethane foam was similarly obtained.

COMPARATIVE EXAMPLE 1

The procedure of Example 1 was repeated, except that triethylene diamine was used instead of potassium dimethylaminopropionate. A foam was obtained at an index of 105, but no foam could be obtained at higher indexes of 133, 172 and 210.

EXAMPLE 2

100 parts of a capped polyether, formed by adding propylene oxide and ethylene oxide to trimethylolpropane, having a molecular weight of 4,500, 0.5 part of water and 0.7 part of a compound of the above formula (3) were premixed, and 55 parts of crude MDI (methylene-bis-diphenylisocyanate) (Millionate MR manufactured by Nippon Polyurethane K.K., isocyanate content 30 to 32%) was added thereto. When the mixture was agitated, a good cold-cured flexible foam was obtained.

The above procedure was repeated, but changing the amount of crude MDI to 70 parts, 100 parts and 120 parts and adjusting the amount of the catalyst so that the catalyst concentration was the same in each case. In each case, a good foam was obtained.

COMPARATIVE EXAMPLE 2

The procedure of Example 2 was repeated, except that tetramethylhexamethylene diamine was employed instead of the catalyst used in Example 2. When the amount of crude MDI was 55 parts, a foam was obtained, but no foam could be obtained when the amount of crude MDI was 70 parts, or larger.

EXAMPLE 3

100 parts of a sugar base polypropylene glycol having an equivalent value of 125, 0.8 part of silicone, 10 parts of Freon 11 and 0.4 parts of a compound of the above formula (9), in which each of R and R' is methyl and $n$ is 3, were premixed, and 104 parts of crude MDI (the index being 100) was added thereto. When the mixture was agitated, a good foam was obtained.

When the above procedure was repeated but changing the amount of crude MDI to 310 parts (the index being 300) and increasing the amounts of Freon 11, silicone and catalyst proportionately so that the same concentrations as above were attained, a good foam was obtained.

COMPARATIVE EXAMPLE 3

The procedure of Example 3 was repeated, except that tetramethylhexamethylene diamine and potassium acetate were employed instead of the catalyst of Example 3. In the case of tetramethylhexamethylene diamine a foam was obtained at an index of 100, but no foam could be obtained at an index of 300. In the case of potassium acetate, a foam was obtained at an index of 300, but no foam could be obtained at an index of 100.

EXAMPLE 4

The procedure of Example 1 was repeated, except that compounds of the above formulae (2) and (5), in which R is methyl, compounds of the above formulae (4), (6) and (7) and a compound of the above formula (8), in which $n$ is 3, were used respectively instead of by potassium dimethylaminopropionate employed in Example 1. In each case, a good foam was obtained.

The embodiments of the invention in which an exclusive property or privilege is claimed are defined as follows:

1. In a process for preparing polyurethane foam by reacting a polyol having at least two active hydrogen atoms, with a polyisocyanate, the improvement which comprises carrying out the reaction in the presence of a catalytic amount of a compound selected from the group consisting of compounds having the formulas

 (1)

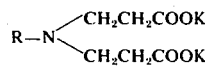 (2)

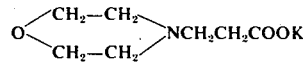 (3)

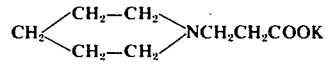 (4)

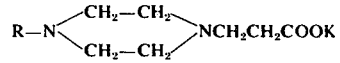 (5)

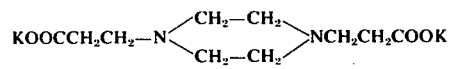 (6)

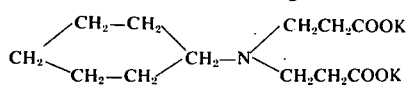 (7)

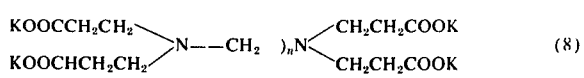 (8)

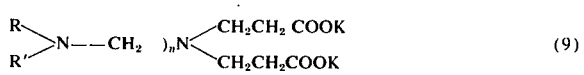 (9)

wherein R and R' are alkyl having 1 to 18 carbon atoms, an $n$ is an integer from 2 to 6, and mixtures thereof, as a catalyst.

2. A process according to claim 1, in which the amount of said catalyst is from 0.1 to 5.0 percent by weight, based on the sum of the weights of polyol and polyisocyanate.

3. A process according to claim 1, in which the index is from 100 to 500, wherein index is the molar ratio × 100, of isocyanate groups in the polyisocyanate to active hydrogen atoms of the polyol.

* * * * *